United States Patent [19]

Blanc et al.

[11] 4,213,785

[45] Jul. 22, 1980

[54] HARDENING CATALYSTS AND ALKALI METAL SILICATE COMPOSITIONS CONTAINING SAME

[75] Inventors: Jean-Pierre Blanc, Antony; François Meiller, Palaiseau, both of France

[73] Assignee: Rhone-Poulenc Industries, Paris, France

[21] Appl. No.: 901,098

[22] Filed: Apr. 28, 1978

[30] Foreign Application Priority Data

May 2, 1977 [FR] France .................... 77 13177

[51] Int. Cl.² ............................................. B28B 7/34
[52] U.S. Cl. ................................ 106/38.35; 106/38.3; 106/74; 106/84
[58] Field of Search ............... 106/74, 38.35, 38.3, 106/84

[56] References Cited

U.S. PATENT DOCUMENTS

| 2,662,022 | 12/1953 | Dietz | 106/74 |
| 3,149,985 | 9/1964 | Gandon | 106/74 |
| 3,306,756 | 2/1967 | Miller | 106/74 |
| 3,317,046 | 6/1967 | Barlow et al. | 106/38.35 |
| 3,493,406 | 2/1970 | Fillet et al. | 106/74 |
| 4,056,937 | 11/1977 | Suzuki | 106/74 |

FOREIGN PATENT DOCUMENTS 2264608 10/1975 France .

*Primary Examiner*—Lorenzo B. Hayes
*Attorney, Agent, or Firm*—Burns, Doane, Swecker & Mathis

[57] ABSTRACT

Catalysts for hardening aqueous alkali metal silicate solutions comprising mixtures of alkylene carbonate and methyl esters of organic acids are disclosed. The hardening catalysts are primarily useful in the production of high quality foundry molds and cores based on alkali metal silicate binders.

15 Claims, No Drawings

HARDENING CATALYSTS AND ALKALI METAL SILICATE COMPOSITIONS CONTAINING SAME

BACKGROUND OF THE INVENTION

1. Field of the Invention

The present invention relates to a hardener for an alkali metal silicate, and to its use in the foundry industry.

2. Description of the Prior Art

U.S. Pat. No. 3,137,046 discloses the preparation of foundry cores and foundry molds using a ternary mixture comprising 93 to 98 parts by weight of a sand suitable for the foundry industry, 2 to 7 parts by weight of an aqueous solution of an alkali metal silicate and a stoichiometric amount, relative to the silicate, of an alkylene carbonate having from 2 to 7 carbon atoms in the alkylene radical. Molds having satisfactory mechanical properties are obtained by this method. It is also known, from French Published Application No. 2,264,608, to use dialkyl esters of diacids (formulae 1 of Tables I and II). Unfortunately, the use of these hardeners suffers from the disadvantage of giving excessively high setting times.

Thus, there exists a need in the art for hardeners for use in the foundry industry which avoid the aforementioned disadvantage while, at the same time, insuring the production of foundry molds and cores exhibiting good mechanical properties.

SUMMARY OF THE INVENTION

Accordingly, it is a primary object of the present invention to provide hardeners, also referred to as hardening catalysts, which preserve the good mechanical properties of the foundry molds and foundry cores while concurrently insuring that these molds and cores possess a short setting time and a relatively long shelf life, which is naturally less than the setting time.

Another object of the present invention is to provide a method of preparing foundry molds and foundry cores using the hardening catalysts of the invention.

Other objects and advantages of the present invention will be evident to those of skill in the art upon studying the detailed description which follows.

DETAILED DESCRIPTION OF THE INVENTION

According to the present invention, there have been discovered catalysts, for hardening aqueous solutions of alkali metal silicates, which are based on alkylene carbonates and are characterized in that they also contain methyl esters of organic acids. The methyl esters of organic acids can be methyl esters of organic monoacids, which may or may not be substituted by other functional radicals. Of these methyl esters of organic monoacids, those derived from substituted or unsubstituted monocarboxylic acids having from 1 to 6 carbon atoms, for example, formic acid, acetic acid, propionic acid, lactic acid, butyric acid, valeric acid and hexanoic acid, are preferred. Methyl lactate is the most preferred of these compounds for use in the present invention. Alternately, they can be dimethyl esters of organic diacids, such as the aliphatic α,ω-diacids having 3 to 10 carbon atoms, for example, malonic acid, succinic acid, glutaric acid and adipic acid. Of these dimethyl esters, dimethyl malonate is most preferred.

The alkylene carbonates employed in the present invention are described in detail in U.S. Pat. No. 3,137,046, which disclosure is hereby incorporated by reference. As disclosed therein, these compounds have a cyclic structure represented by the general formula:

wherein R is the alkylene radical. Of these alkylene carbonates, those having from 2 to 10 carbon atoms in the alkylene radical are preferred for use in the present invention. Ethylene carbonate and propylene carbonate have been found to be particularly effective and hence are the most preferred of the alkylene carbonate compounds.

In general, about 4 to 30 parts by weight of the methyl ester of an organic acid are employed per 96 to 70 parts by weight of alkylene carbonate. Optionally, this mixture can be diluted with a solvent which regulates the reactivity towards the alkali metal silicate. Aliphatic polyols and, preferably, polyalkylene glycols such as diethylene glycol can be used as such solvents. These solvents can be used, for example, at the rate of 2 to 20 parts by weight per 100 parts by weight of the alkylene carbonate/methyl ester hardener.

In practice, in the manufacture of foundry molds and foundry cores, about 0.4 to 1.2 parts by weight of hardener (i.e., the mixture of alkylene carbonate+methyl ester), and preferably about 0.5 to 1 part by weight, is employed per 100 parts by weight of a mixture of about 90 to 97 parts of sand per 3 to 10 parts of an alkali metal silicate solution.

Information on the nature of the solution of alkali metal silicate and sand used to prepare foundry molds and cores is available (see, for example, U.S. Pat. No. 3,137,046, and French Published Application No. 2,264,608). For various practical and economic reasons, sodium silicate is preferably selected from amongst the alkali metal silicates.

Processes for obtaining a foundry mold or a foundry core from a composition comprising sand, an aqueous solution of an alkali metal silicate and a hardener are also described in the aforementioned patent literature. The use of the hardeners according to the present invention does not significantly modify these methods. In particular, it is possible to work at ambient temperature which, depending on the season and the climate, generally varies between about 0° and 30° C. Adjustments to maintain an approximately constant setting time in the event of a temperature drop is accomplished by increasing the proportion of the methyl ester relative to the alkylene carbonate.

As already stated, the hardening catalysts according to the present invention make it possible to obtain short setting times and relatively long shelf lives while preserving the mechanical properties of the articles obtained. The advantages of the present invention were measured with the aid of the following tests:

SHELF LIFE

This is the maximum storage time for the mixture of sand+silicate+hardener before using it for constructing a foundry mold or foundry core, without resulting in a deterioration of mechanical properties. The zero time is the instant at which the silicate is added to the mixture of sand+hardener. The shelf life is computed by noting the instant from which molding results in a hardened article with mechanical properties inferior to those obtained by immediate use of the mixture of the three constituents.

SETTING TIME

The zero time is the instant at which the silicate is added to the premix of sand+hardener. The mixture of sand+hardener+silicate is enclosed in a leaktight plastic bag to isolate it from the action of the carbon dioxide in the ambient atmosphere. Every 3 minutes, the mixture is pressed with a finger to determine the instant when hardening is such that it is no longer possible to alter the surface of the agglomerated sand.

TWO-STAGE MOLD FILLING TEST

In a first stage, half the mold is filled with the mixture of sand+hardener+silicate, while the mold is continuously vibrated. This first layer is left exposed to the atmosphere of the workshop for 4 minutes. After this time period, the mold is completely filled, without vibration, in a second stage, (a second vibration would destroy the cohesion of the first layer which has already reacted).

After setting (15 to 20 minutes) the mold is allowed to drop on an edge. A clean break must not appear at the level of separation of the two parts.

SPINDLE RESISTANT TEST

The mold is filled in a single stage, embedding, in each half-length, a hollow plastic tube (55 mm long and 30 mm wide) at 6 cm from the upper face of the mold. The latter is vibrated for a few seconds.

After setting, which generally requires approximately 15 minutes, the resulting article is released and the mold is raised by means of a pneumatic lifting apparatus with two spindles placed, respectively, in each hollow plastic tube. The nonreinforced mold must be capable of pivoting on its axis without a crack appearing at the hollow tubes.

COMPRESSIVE STRENGTH TEST

After preparing the molding mixture (sand+hardener+silicate) in a KENWOOD planetary mixer, 6 compressive strength test samples are made up in 4 minutes in a core box. These samples, which are tamped, have a diameter of 5 cm and a height of 5 cm, are stored in the absence of air, before measuring their compressive strength at time intervals of between 10 minutes and 1 hour, on the+GF+, type SPDR, strength tester. As in the preceding tests, zero time is taken to be the instant at which the silicate is introduced.

To further illustrate the various aspects of the present invention, the following examples are provided. It is understood that their purpose is entirely illustrative and in no way intended to limit the scope of the invention.

EXAMPLE 1

The constituents of the molding mixture were introduced in the following order into a KENWOOD planetary mixer, at a temperature of between 18° and 20° C.: 1 kilogram of SIFRACO sand, 5 g of a hardener, followed by a first mixing operation of 1 minute and 30 seconds and 35 g of an aqueous sodium silicate solution followed by a second mixing operation of 45 seconds. The sodium silicate solution had a water content of 55.2% and a solids content of 44.8%. The weight ratio of $SiO_2/Na_2O$ was 2.39, the density at 20° C. was 1.525 and the viscosity was 600 cPs at 20° C.

The hardener was a mixture of propylene carbonate and methyl lactate in various proportions by weight.

The sand used had the following properties: specific surface area 115 $cm^2/g$; apparent density 1.5; loss on ignition 0.15%. It contained a minimum of 99.7% of $SiO_2$ and a maximum of 0.1% of clay, with traces of calcium carbonate. Its particle size distribution was:

1% greater than 420µ
26% between 420 and 300µ
47% between 300 and 210µ
23% between 210 and 150µ
3% between 150 and 105µ.

The results of the shelf life tests, setting time tests and compressive strength tests are summarized in Table I below. Measurements were carried out at a temperature of between 18° and 20° C.

TABLE I

| Composition of the hardener (in parts by weight) | | Shelf life (in minutes) | Setting time (in minutes) | Compressive strength (kg/cm²) after | | | | | |
|---|---|---|---|---|---|---|---|---|---|
| | | | | 10 minutes | 15 minutes | 20 minutes | 30 minutes | 40 minutes | 1 hour |
| propylene carbonate | 85 | 4 | 15 | 4 | 7 | 13 | 18 | 27 | 31 |
| methyl lactate | 15 | | | | | | | | |
| propylene carbonate | 87 | 5 | 15 | 3 | 6 | 11 | 17 | 26 | 30 |
| methyl lactate | 13 | | | | | | | | |
| propylene carbonate | 90 | 7 | 17 | 1 | 5 | 10 | 14 | 24 | 29 |
| methyl lactate | 10 | | | | | | | | |

The three different samples were also observed to satisfy the two-stage mold filling test and the spindle resistance test, described previously.

It was also confirmed that slight variations in the characteristics of the particular sodium silicate employed had no significant effect on the results. Thus, the viscosity of the aqueous sodium silicate solution could vary between 550 and 650 cPs at 20° C., its density between 1.52 and 1.53 and the $SiO_2/Na_2O$ weight ratio between 2.37 and 2.42, without significantly altering the test results.

EXAMPLE 2

The same procedure as in Example 1 was followed, except that the hardener was a ternary mixture of propylene carbonate, dimethyl malonate and diethylene glycol. The numerical results of the tests are summarized in Table II below.

TABLE II

| Composition of the hardener (in parts by weight) | | Shelf life (in minutes) | Setting time (in minutes) | Compressive strength (kg/cm²) after | | | | | |
|---|---|---|---|---|---|---|---|---|---|
| | | | | 10 minutes | 15 minutes | 20 minutes | 30 minutes | 40 minutes | 1 hour |
| propylene carbonate | 85 | 4 | 15 | 4 | 9 | 15 | 22 | 27 | 29 |
| dimethyl malonate | 7 | | | | | | | | |
| diethylene glycol | 8 | | | | | | | | |
| propylene carbonate | 90 | 6 | 16 | 3 | 7 | 12 | 19 | 23 | 27 |
| dimethyl malonate | 5 | | | | | | | | |
| diethylene glycol | 5 | | | | | | | | |

These formulations also satisfied the two-stage mold filling test and the spindle resistance test conducted at temperatures between 18° and 20° C.

While the present invention has now been described in terms of certain preferred embodiments, and exemplified with respect thereto, the skilled artisan will readily appreciate that various modifications, changes, omissions, and substitutions may be made without departing from the spirit thereof. It is intended, therefore, that the present invention be limited solely by the scope of the following claims.

What is claimed is:

1. A composition of matter for hardening aqueous alkali metal silicate solutions consisting essentially of a mixture of an alkylene carbonate having 2 to 10 carbon atoms in the alkylene radical and a methyl ester of an organic acid which is selected from the group consisting of a methylester of a monocarboxylic acid containing 1 to 6 carbon atoms and a dimethylester of a dicarboxylic acid containing 3 to 10 carbon atoms, in a weight ratio of 4 to 30 parts by weight of ester to 70 to 96 parts by weight of carbonate.

2. The composition as defined by claim 1, wherein said methyl ester of an organic acid is selected from the group consisting of methyl esters of organic monocarboxylic acids.

3. The composition as defined by claim 1, wherein said methyl ester is methyl lactate.

4. The composition as defined by claim 1, wherein said methyl ester of an organic acid is selected from the group consisting of dimethyl esters of organic dicarboxylic acids.

5. The composition as defined by claim 4, wherein said dimethyl esters of organic dicarboxylic acids are selected from the group consisting of dimethyl esters of aliphatic α,ω-dicarboxylic acids.

6. The composition as defined by claim 5, wherein said dimethyl ester is dimethyl malonate.

7. The composition as defined by claim 1, further comprising a solvent for regulating the reactivity of the alkylene carbonate and methyl ester towards the alkali metal silicate solution.

8. In a composition of matter for producing foundry molds, comprising sand, an aqueous alkali metal silicate solution and a hardener therefor, the improvement which comprises, as said hardener, the composition as defined by claim 1.

9. The composition as defined by claim 8, wherein said mixture of an alkylene carbonate and methyl ester of an organic acid is present in amounts of about 0.4 to 1.2 parts by weight per 100 parts by weight of the mixture of about 90 to 97 parts by weight of sand and about 3 to 10 parts by weight of the alkali metal silicate solution.

10. In a method for producing foundry molds and foundry cores, comprising mixing sand, an aqueous solution of an alkali metal silicate, and a hardening catalyst, the improvement comprising including in the mixture, as said hardening catalyst, a sufficient quantity of a mixture of an alkylene carbonate having 2 to 10 carbon atoms in the alkylene radical and a methyl ester of an organic acid which is selected from the group consisting of a methylester of a monocarboxylic acid containing 1 to 6 carbon atoms and a dimethylester of a dicarboxylic acid containing 3 to 10 carbon atoms, in a weight ratio of 4 to 30 parts by weight of ester to 70 to 96 parts by weight of carbonate, and then shaping the mix and allowing the shaped mix to set.

11. The method as defined by claim 10, wherein said methyl ester of an organic acid is selected from the group consisting of methyl esters of organic monocarboxylic acids.

12. The method as defined by claim 11, wherein said methyl ester is methyl lactate.

13. The method as defined by claim 10, wherein said methyl ester of an organic acid is selected from the group consisting of dimethyl esters of organic dicarboxylic acids.

14. The method as defined by claim 13, wherein said dimethyl esters of organic dicarboxylic acids are selected from the group consisting of dimethyl esters of aliphatic α,ω-dicarboxylic acids.

15. The method as defined by claim 14, wherein said dimethyl ester is dimethyl malonate.

* * * * *